July 21, 1931.  I. HERLITZ  1,815,712

DIFFERENTIAL PROTECTIVE SYSTEM FOR ELECTRICAL MACHINERY AND APPARATUS

Filed Nov. 8, 1927

IVAR HERLITZ
INVENTOR

BY

ATTORNEY.

Patented July 21, 1931

1,815,712

UNITED STATES PATENT OFFICE

IVAR HERLITZ, OF MAGNET, LUDVIKA, SWEDEN, ASSIGNOR TO ALLMÄNNA SVENSKA ELEKTRISKA AKTIEBOLAGET, OF VASTERAS, SWEDEN, A CORPORATION OF SWEDEN

DIFFERENTIAL PROTECTIVE SYSTEM FOR ELECTRICAL MACHINERY AND APPARATUS

Application filed November 8, 1927, Serial No. 231,936, and in Sweden April 12, 1927.

For indicating such faults in electrical machinery or apparatus which cause an internal leakage of current between different phase windings, relays are employed which are differentially actuated by the incoming and outgoing current, for instance by means of two current transformers the primaries of which are inserted in conductors on either side of the machine or apparatus which are normally intended to carry equal currents. As the said current transformers have hitherto been arranged, however, it has generally not been possible to utilize them for other purposes than that referred to, because this would result in an unsymmetrical load with a risk of an undue operation of the differential protective device.

The present invention has for its object to provide an arrangement for enabling current transformers provided for differential protection to be employed also for other purposes. According to the invention, the current transformers have two secondary windings each. One of the said windings of one transformer is connected in the same direction as the corresponding winding of the other transformer, and the circuit thus formed can be used for actuating measuring instruments and other relays. The two other windings of the current transformers are connected against each other and actuate the differential relay or a corresponding current measuring member. The invention also relates to a particular disposition of the current transformers in magnetical respect, as further specified below, by which a further security against undue release is obtained.

In the appended claims, any electrical device adapted to be protected by the means forming object of the invention is generally referred to as "electrical apparatus".

Figure 1:
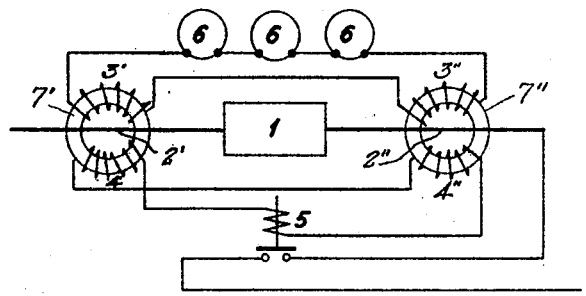
Figure 2:
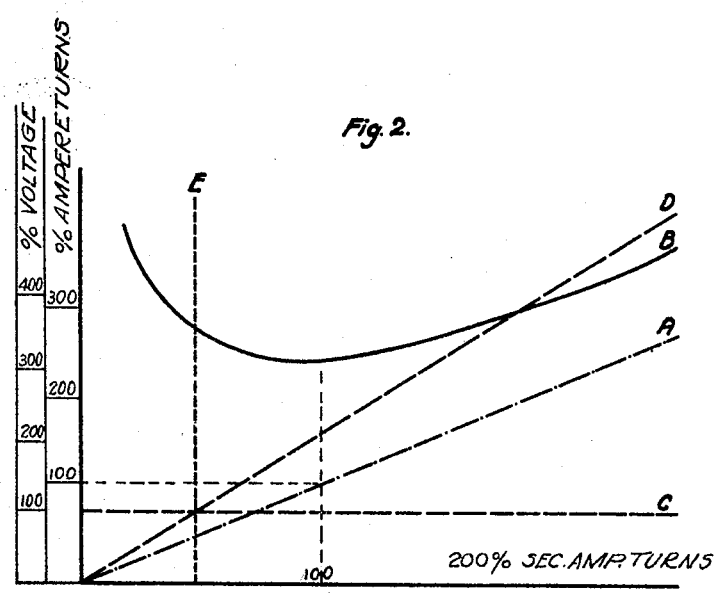

In the accompanying drawings, Fig. 1 shows a diagram of connections for the arrangement and Fig. 2 a diagram of the current and voltage conditions etc. in the current transformers and the relay.

In Fig. 1, 1 is the machine or apparatus to be protected, 2' and 2" the primaries of the two current transformers, 3' and 3" their co-acting and 4' and 4" their counteracting secondaries, and 7', 7" are the iron cores of the said transformers, 5 is the differential relay actuated by the latter ones, and 6 relays, meters, or other current measuring devices actuated by the windings 3' and 3".

With this arrangement, undue releases are excluded as long as the current transformers have exactly equal characteristics. If the circuit formed by the two windings 4', 4" is for instance assumed to be open and the primary currents equal, the resultant ampere-turns must be exactly equal in both current transformers. If the magnetic properties of the latter are exactly the same, the saturation and the voltage induced in the windings 4', 4" will also be exactly equal in both transformers, whence no current can flow if the circuit formed thereby is closed.

In order to find the most appropriate dimensioning of the current transformers for causing a release at the smallest possible fault current and simultaneously preventing undue release on the occasion of heavy currents by reason of unequal properties of the current transformers, the assumption may preferably serve as a basis that a leakage path in the apparatus 1 protected by the relays is fed by equal fault currents from both sides. This assumption, which facilitates the analysis by giving zero current in the co-acting windings 3' and 3", can be shown to be the most unfavourable one from the point of view of the sensibility of the differential relay.

As a relay of a certain construction always requires a certain amount of voltamperes for its function, it is easily seen that it is only the proportion between the numbers of turns of the differential winding and of the relay which has any importance for the action of the relay. A variation of the two numbers of turns in the same proportion implies only a variation of the ratio of the arrangement but has no influence on the sensibility. One of these quantities may therefore be chosen as fixed and only the other varied. The relay may then be assumed to be so wound as to require a current=I for release, in which case its voltage is determined by its other properties.

In Fig. 2, the abscissæ designate different numbers of secondary ampereturns on the current transformers employed, drawn to one scale, while the ordinates designate the corresponding primary fault current for effecting release drawn to another scale as well as the secondary voltage which possibly may arise for a symmetrical primary current on account of inequalities in the current transformers employed, drawn to a third scale. The different quantities are counted in percentages of a certain assumed value.

As the necessary secondary current is =I, the total number of ampereturns in both current transformers corresponding thereto will be =2 In, where n is the number of turns in one transformer. The said number of ampereturns is represented by the straight line A in Fig. 2 and would also give the necessary primary ampereturns for release, if the current transformers required no exciting current. However, the said transformers must be excited to the flux density necessary for giving the voltage required to force the release current through the relay. This flux density can be calculated from the area of the iron core and will obviously be inversely proportional to the number of winding turns. From the saturation curve of the iron and the flux path length of the transformer the necessary exciting ampereturns may then be calculated. If these are added to the secondary ampereturns represented by the line A, the necessary primary ampereturns are obtained. The curve B will be the result. As seen, this curve shows a minimum of primary ampereturns for a certain value of the number of secondary winding turns, and this minimum equals a little over twice the number of secondary ampereturns at this point. If a smaller sensibility is considered sufficient, that is, if a larger number of ampereturns necessary for release is permitted, two different numbers of primary ampereturns may be chosen which give the same sensibility.

As already stated, any risk of undue release is excluded with this arrangement as long as the current transformers are exactly equal. Unavoidable inequalities in the magnetic properties of the latter cause however a risk of undue release which may be estimated in the following manner:

If the differential winding is assumed to be entirely open, there will be a certain resultant voltage in the differential windings on account of unavoidable inequalities in the current transformers. This voltage will be proportional to the difference in saturation which may arise in the two current transformers if their magnetizing currents are equal. As long as the differential winding is open, the magnetizing ampereturns will be equal for both transformers, because the primary current as well as the current in the operating winding 3' or 3'' is equal in both. The difference of saturation is kept within rather moderate values, and its upper limit can be experimentally determined for the sheet iron qualities employed. The highest voltage which can arise between the terminals of an open circuit through 4' and 4'' is obviously proportional to the number of winding turns and may be represented by the line D in Fig. 2. If the circuit is then closed through the relay, the voltage on the relay will obviously be somewhat lower than the voltage for an entirely open winding, but the reduction may for high saturations be rather insignificant, and it is most safe to reckon with the line D.

The voltage necessary for release of the relay can be represented in the same scale for instance by the horizontal line C. In the region where D falls below C, no undue release can therefore occur, while on the other hand a certain risk for such release always exists as soon as D lies above C. The region to the left of the vertical line E is thus entirely safe against undue release. In practice it is found, that the upper limit of this region lies in the neighbourhood of the minimum of the curve B, that is, for such dimensioning of the current transformers as will give a magnetizing current of the same order of magnitude as the secondary current, that is the release current of the relay. Such dimensioning of the current transformers for the purpose of preventing undue release in the case of an overload current therefore also forms an object of the invention.

I claim as my invention:—

1. Fault responsive and current measuring devices for electrical apparatus comprising in combination, a current transformer having one primary winding connected to one terminal of the apparatus, two secondary windings and a common iron core, a second current transformer having one primary winding connected to the other terminal of said apparatus, two secondary windings and a common iron core, current responsive means connected in circuit with one secondary winding of the first current transformer and one secondary winding of the second current transformer which counteract each other, and conductors connecting the other secondary windings of the current transformers so as to allow their secondary currents to flow in the same direction.

2. Fault responsive and current measuring devices for electrical apparatus comprising in combination, a current transformer having one primary winding connected to one terminal of the apparatus, and two secondary windings, a second current transformer having one primary winding connected to the other terminal of said apparatus, two secondary windings, and a common iron core, indicating current measuring means connected in circuit with one secondary winding of the first current transformer and one secondary winding of the second current transformer which counteract each other, and circuits containing other current measuring means connecting the other secondary windings of the current transformers so as to allow their secondary currents to flow in the same direction through said other measuring means.

3. Fault responsive and current measuring devices for electrical apparatus comprising in combination, a current transformer having one primary winding connected to one terminal of the apparatus, two secondary windings and a common iron core, a second current transformer having one primary winding connected to the other terminal of said apparatus, two secondary windings and a common iron core, a relay connected in circuit with one secondary winding of the first current transformer and one secondary winding of the second current transformer which counteract each other, the minimum release current of said relay being of the same order of magnitude as the magnetizing current of said current transformer for the minimum release voltage of said relay, and conductors connecting the other secondary windings of the current transformers so as to allow their secondary currents to flow in the same direction.

4. Fault responsive and current measuring devices for electrical apparatus comprising in combination, a current transformer having one primary winding connected to one terminal of the apparatus, two secondary windings and a common iron core, a second current transformer having one primary winding connected to the other terminal of said apparatus, two secondary windings and a common iron core, a relay connected in circuit with one secondary winding of the first current transformer and one secondary winding of the second current transformer which counteract each other, the minimum release voltage of said relay exceeding the maximum voltage difference of said secondary windings caused by equal primary currents, and conductors connecting the other secondary windings of the current transformers so as to allow their secondary currents to flow in the same direction.

In testimony whereof I have affixed my signature to this specification.

IVAR HERLITZ.